(12) United States Patent
Rixen

(10) Patent No.: US 6,275,655 B1
(45) Date of Patent: Aug. 14, 2001

(54) HEATING SYSTEM FOR POTABLE WATER AND RELATIVELY SMALL AREAS

(76) Inventor: James M. Rixen, 2412 N. Hayden Island Dr., Portland, OR (US) 97217

( * ) Notice: Subject to any disclaimer, the term of this patent is extended or adjusted under 35 U.S.C. 154(b) by 0 days.

(21) Appl. No.: 09/321,919

(22) Filed: May 28, 1999

Related U.S. Application Data

(60) Provisional application No. 60/087,184, filed on May 29, 1998.

(51) Int. Cl.$^7$ .................................. F28D 7/00; A47J 31/00
(52) U.S. Cl. .......................... 392/496; 392/495; 392/465
(58) Field of Search .................................... 397/496, 449, 397/451, 456, 465, 495; 165/48.1, 58, 64, 66, 41, 42, 43; 126/344

(56) References Cited

U.S. PATENT DOCUMENTS

| | | |
|---|---|---|
| 2,661,015 | 12/1953 | Allred et al. . |
| 2,894,265 | 7/1959 | Reardon . |
| 2,975,797 | 3/1961 | Matheney . |
| 3,013,548 | 12/1961 | Thomas . |
| 3,224,218 | 12/1965 | New . |
| 3,276,634 | 10/1966 | Arnot . |
| 3,341,081 | 9/1967 | King . |
| 3,521,704 | 7/1970 | Bridegum . |
| 3,566,957 | 3/1971 | Bridegum . |
| 3,645,327 | 2/1972 | Henley . |
| 4,055,279 | 10/1977 | Lapera et al. . |
| 4,274,390 | 6/1981 | Azuma . |
| 4,354,548 | 10/1982 | Carlsson . |
| 4,562,890 | 1/1986 | Matoba . |
| 4,632,180 | 12/1986 | Lauderdale . |
| 4,925,092 | 5/1990 | Yoshida et al. . |
| 5,025,985 | * 6/1991 | Enander ................................ 237/2 A |
| 5,039,007 | * 8/1991 | Wolter ................................... 236/12.1 |
| 5,076,494 | * 12/1991 | Ripka .................................... 237/19 |
| 5,190,025 | 3/1993 | Chen . |
| 5,233,970 | * 8/1993 | Harris .................................... 126/351 |
| 5,299,329 | 4/1994 | Constantini . |

* cited by examiner

Primary Examiner—Teresa Walberg
Assistant Examiner—Thor Campbell
(74) Attorney, Agent, or Firm—Kolisch Hartwell Dickinson McCormack & Heuser

(57) ABSTRACT

A supplemental heating system for heating a first fluid such as potable water. The supplemental heating system is configured for use in a recreational vehicle having a primary heating system that also heats the first fluid. The supplemental heating system includes a heating element that heats a second fluid and a heat exchanging component removably fitted into the recreational vehicle and having a first fluid conduit for permitting the first fluid to enter and exit the heat exchanging component, and a second fluid conduit for permitting the second fluid to enter and exit the heat exchanging component. Heat from the second fluid is transferred to the first fluid within the heat exchanging component and thereby provides a heating operation of the first fluid independent of the heating system of the recreational vehicle.

12 Claims, 3 Drawing Sheets

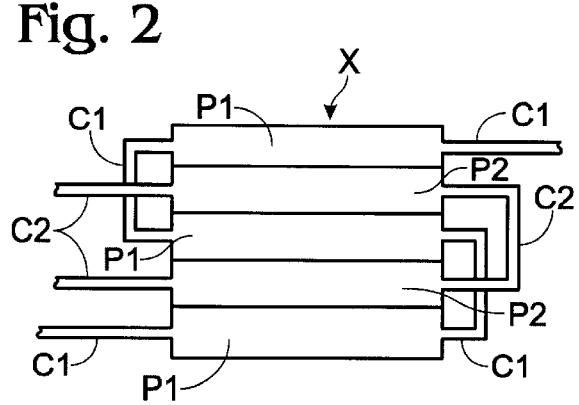
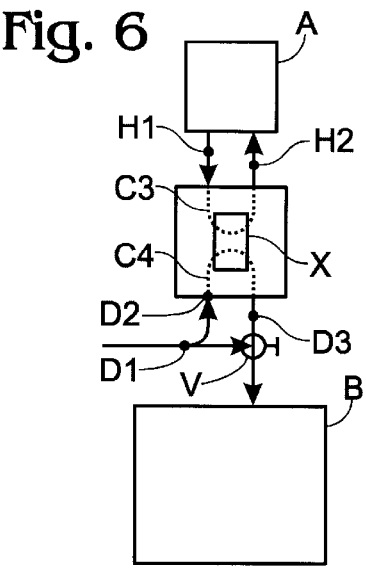
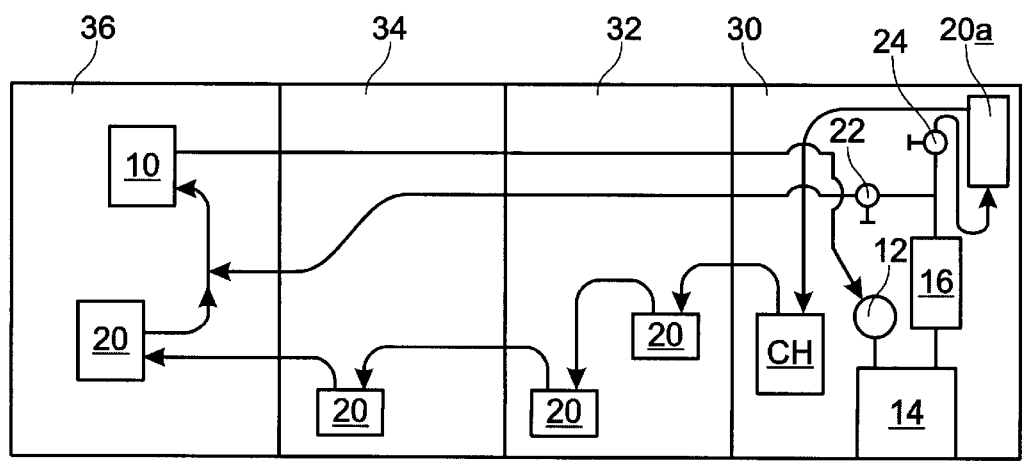

HEATING SYSTEM FOR POTABLE WATER AND RELATIVELY SMALL AREAS

CROSS REFERENCE TO RELATED APPLICATIONS

This application claims priority to U.S. provisional patent application Ser. No. 60/087,184, filed May 29, 1998 and entitled POTABLE WATER HEATING SYSTEM. The subject matter of this application is incorporated herein by this reference.

TECHNICAL FIELD

The present invention relates generally to heating systems, and more particularly, to potable water heating systems and heating systems for use in recreational vehicles, campers, cabins, boats, and other applications with relatively small areas to be heated, as distinguished from general residential home or commercial business/factory heating applications.

BACKGROUND ART

Conventional systems for heating water and/or relatively small living spaces such as in a recreational vehicle generally fall into two classes of systems. The first class includes systems that have a heating element(s) that extend into a cavity which holds several gallons of water. That heating element ultimately heats the entire volume of water. Drawbacks to this first class include a lack of continuous hot water. In other words, if the entire tank containing several gallons of water is used, there is no longer hot water for the user and a period of time must elapse before hot water is available again. Because the entire volume of water must be heated by the heating element, it takes a relatively long time period to heat the water with such a system.

The second class of systems involves heating a relatively small volume of water with a gas or electric heating device. Conventional water heating systems for recreational vehicles in this class usually include a propane or other open-flame "flash furnace" heating system that directly heats the domestic eater. Open-flame systems like these are relatively expensive and relatively unsafe when used in a recreational vehicle. In addition, a propane heating system generally cannot provide a constant supply of hot water. Furthermore, the heating device adds to the complexity of the system and will wear and fail over time.

DISCLOSURE OF THE INVENTION

The present invention overcomes the drawbacks of conventional systems by providing a water heating system/heating system that utilizes a flash heating process for heating potable water. The flash heating process includes using water as the flash heating source. As a result, the present invention is capable of delivering a continuous supply of water heated to a desired temperature such as between 100–130° F. for potable water uses including drinking, washing, showering, bathing, etc. The present invention is designed to be used in relatively small enclosures, such as for use in a space that is less than approximately 50,000 cubic feet.

Preferably, the present invention is used to provide hot water, and also to provide heat to the coach of a recreational vehicle. The approximate volume of space to be heated in a recreational vehicle coach is approximately 25,000 cubic feet.

The invention may also be thought of as a water heating system for use in recreational vehicles such as boats and motor homes. The hot water system of the present invention uses fluid heated by an independent heat source to heat domestic water.

These and other objects and advantages of the present invention will be more readily understood after a consideration of the drawings and the detailed description of the preferred embodiment which follows.

BRIEF DESCRIPTION OF THE DRAWINGS

FIG. 2 is a schematic diagram of a heat exchanger used in the present invention.

FIG. 4 is a partially schematic and partially representational diagram showing how the second embodiment of the invention may be installed in a recreational vehicle.

FIG. 6 is a schematic diagram of the second embodiment.

DETAILED DESCRIPTION OF THE PREFERRED EMBODIMENT AND BEST MODE OF CARRYING OUT THE INVENTION

Figure 1:
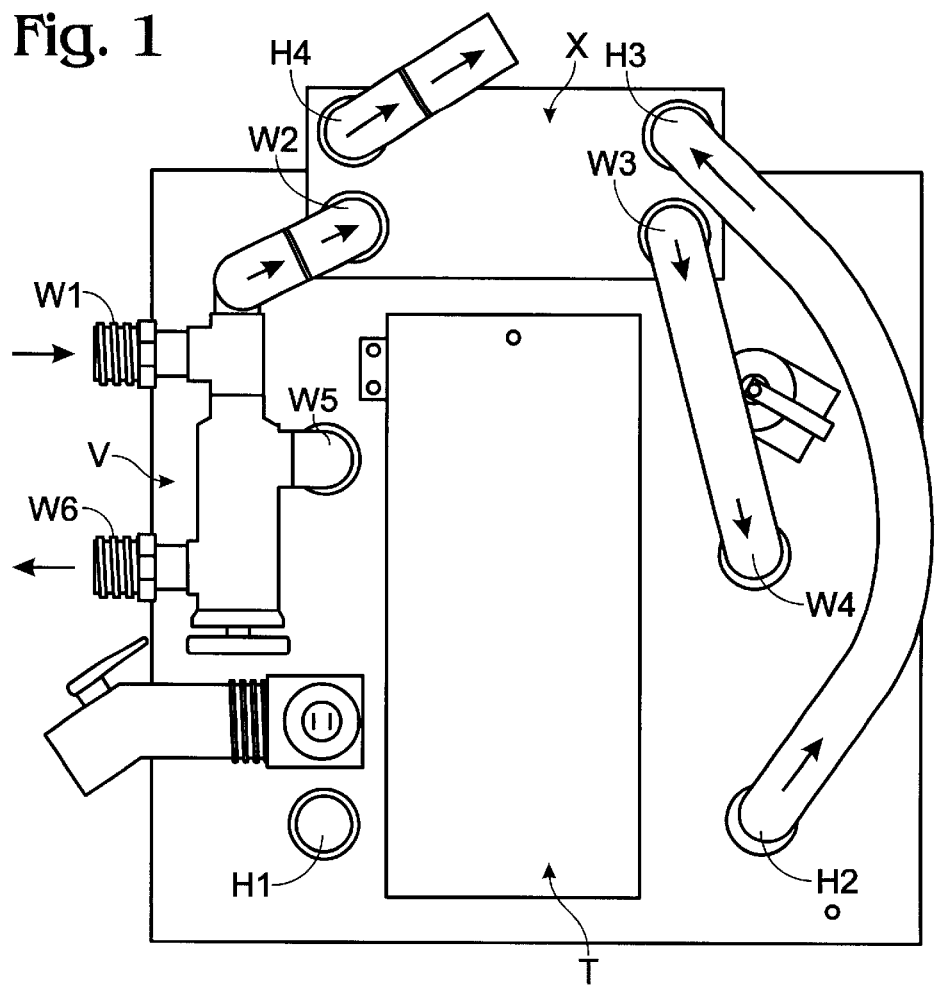
FIG. 1 is a side elevational view of a first embodiment of the invention.

Referring to FIGS. 1 and 2, one version of the present invention (known commercially under the trademark CONSTAHOT™) is depicted as a heating system for a recreational vehicle. The heating system includes a primary water heater T with a primary water storage vessel, which may be a 6-gallon tank. The heating system also includes a relatively small pre-heater or heat exchanger X which is in communication with and is installed upstream of water heater T. The heat exchanger has a capacity to process and store about a quart of water, and may be therefore thought of as a secondary water storage vessel.

Heating fluid from an independent heat source, such as a combustion engine or furnace marketed under the trademark HURRICANE, enters and exits water heater T at H1 and H2, respectively. The heating fluid moves through a pipe to the input H3 of heat exchanger X and exits the heat exchanger at H4. The heating fluid is maintained in a conduit C1 between input H3 and output H4 FIG. 2). The conduit directs the heating fluid through first stacked stainless steel plates P1 inside heat exchange X. The independent heat source thus provides heating fluid to both water heater T and heat exchanger X. However, it is within the scope of the invention for the independent heat source to supply only heat exchanger X with heating fluid. The heat source is preferably a 12 volt/diesel-fired hydronic heat source with a 40,000 BTU output. The heating fluid is preferably a two-part mixture of glycol and water. A preferred range for that mixture is between 30–50% glycol and a corresponding 70–50% of water. It has been found that a 40% glycol/60% water mixture is optimal for the recreational vehicle application of the present invention.

Still referring to FIG. 1, the water to be heated, known as domestic or potable water, enters the invention at W1. The domestic water enters heat exchanger X at W2 and is pre-heated by the heating fluid by flowing through a conduit C2, which directs the domestic water through second stacked stainless steel plate-like elements P2, which alternate with first stacked elements P2 as shown in FIG. 2, to allow heat to transfer between the two flows. The domestic water exits the heat exchanger at W3 and enters water heater T at W4. The domestic water interacts with the heating fluid within the water heater by conventional heat transfer methods and exits the water heater at W5. A tempering valve V allows a user to adjust final water output temperature. If domestic water at W5 is too hot, tempering valve V is adjusted to mix cooler water from W1 to lower the temperature of the water. Water at the desired temperature exits the invention at W6 ready to use.

FIG. 2, is a schematic depiction of how heated water is used to heat domestic (cold) potable water in a heat exchanger. It should be understood that various heat exchangers may be used depending upon the application and government regulatory requirements. Heat exchangers that are double-walled with a vented air gap between the double walls may be preferred to meet government safety requirements. One such double walled heat exchanger is made by Doucette Industries, Inc. and given part no. NSY2M1/1P-7SCC (O) SM.

A variation of the above embodiment adds a sensing switch (not shown) that senses the temperature of the domestic water in the 6-gallon tank. When the temperature reaches a certain level, the independent heat source is activated, thereby circulating heating fluid through the heat exchanger and pre-heating the domestic water.

Figure 3:
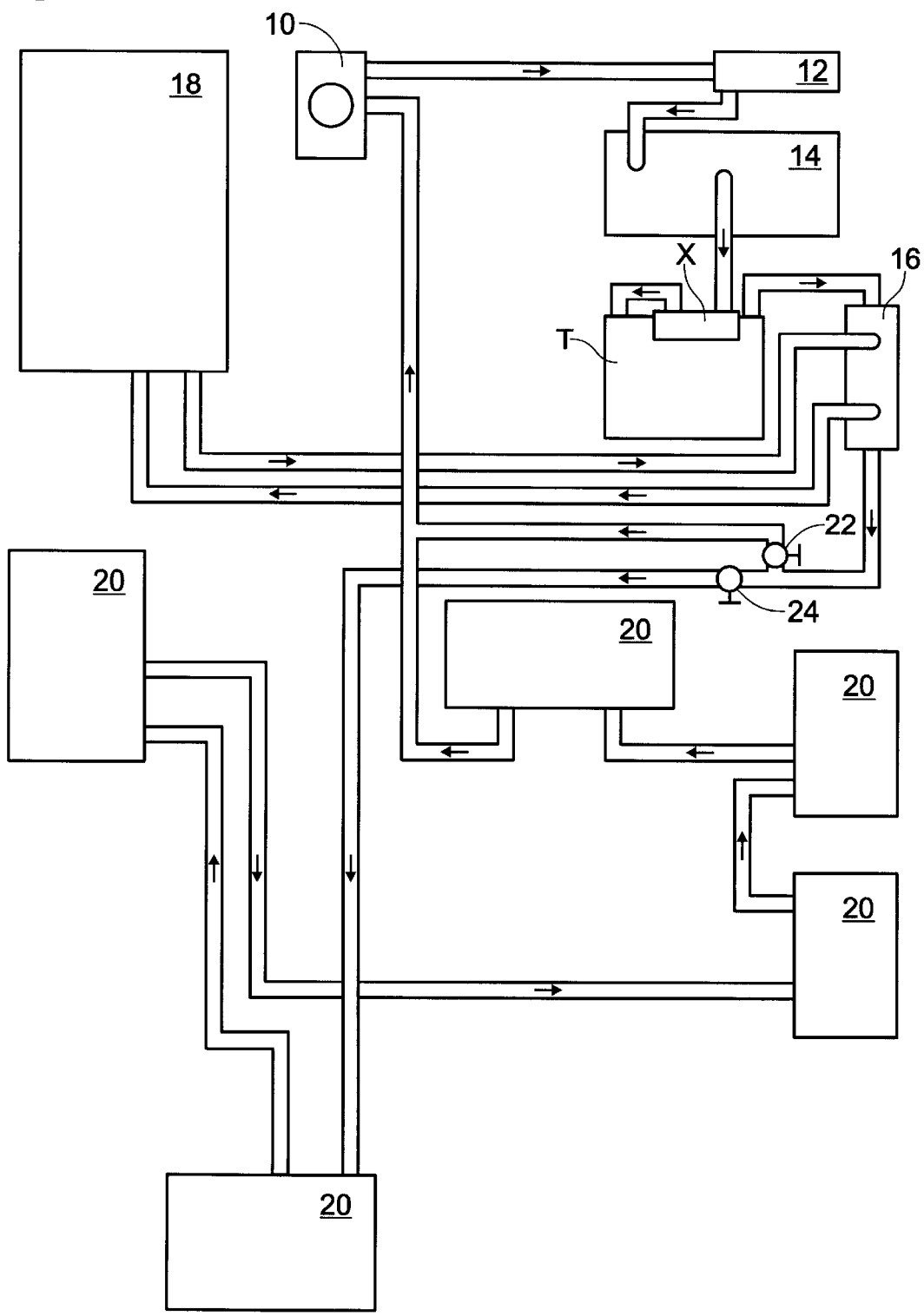
FIG. 3 is a diagram showing how the second embodiment may be installed in a recreational vehicle.

FIG. 3 provides an illustration of a typical plumbing system for a recreational vehicle that includes the CONSTAHOT™ version of the invention. Water in an expansion tank 10 is drawn by a pump 12 into a furnace or independent heat source 14. After passing through heat exchange X and water heater T, the water flows through an exchanger 16 that transfers heat from the engine 18 of the recreational vehicle. the water then travels to various fan units 20 where the heated water transfers heat to the interior of the recreational vehicle. The specific path the water travels is determined by the states of a summer valve 22 and a winter valve 24, which are alternatively opened and closed. When summer valve 22 is open and winter valve 24 is closed, water bypasses fan units 20 and returns to expansion tank 10. When summer valve 22 is closed and winter valve is open, water flows through fan units 20 to heat the interior of the vehicle.

FIG. 4 shows a partially schematic/partially representational depiction of another plumbing system that includes the CONSTAHOT™ version of the invention, and also illustrates how and where that version of the invention may be located in a standard coach of a recreational vehicle. Recreational vehicle RV includes a living area 30, a kitchen 32, a bathroom 34, and a bedroom 36. Water flows from expansion tank 10, through pump 12, and into a furnace or independent heat source 14. The water is heated by exchanger 16 and then flows through either a summer valve 22 or winter valve 24. If the water flows through summer valve 22, the water returns to expansion tank 12. If the water flows through winter valve 24, the water goes through fan 20a in living area 30 and then through the CONSTAHOT™ system CH. The water flows through fans 20 and returns to expansion tank 10.

Figure 5:
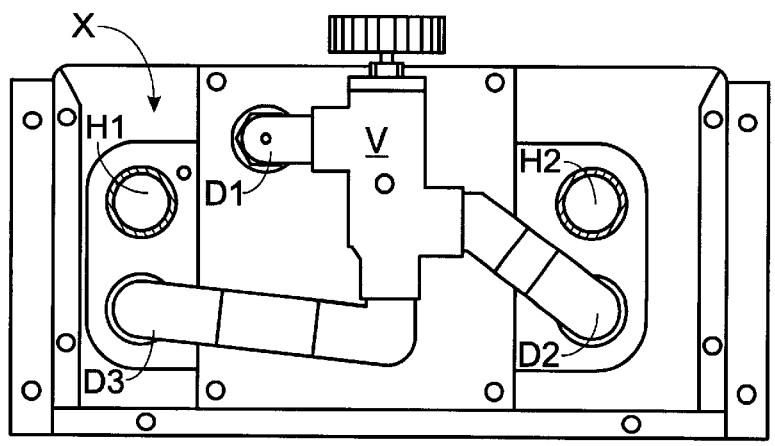
FIG. 5 is a side elevational view of a second embodiment of the invention.

FIGS. 5 and 6 show another embodiment of the invention, also referred to as the MAGICHOT™ heating system, which is a supplemental heating system that includes a heat exchanging component such as heat exchanger X, that can be associated with or fitted onto an existing primary heating system such as a water heater unit B. Heat exchanger X is retrofittable or removably fitted into a recreational vehicle. Heating fluid from a heating element such as an independent heat source A enters the heat exchanger at H1, flows through a conduit C3 within/the heat exchanger, and exits the heat exchanger at H2. A fluid such as domestic or potable water enters at D1, flows through tempering valve V, and enters the heat exchanger at D2. The domestic water flows through a conduit C4 in the heat exchanger and exits the heat exchanger at D3. As in the embodiment shown in FIG. 1, tempering valve V moderates the temperature of the output domestic water by mixing it with unheated domestic water from D1. A sensing switch (not shown) can also be provided in the existing water heater to activate the independent heat source to begin the pre-heating process.

Another way to describe the invention is as follows: FIGS. 1 and 2 disclose the CONSTAHOT™ embodiment of the invention, which combines a replacement 6-gallon domestic hot water tank with a high efficiency, extremely compact heat exchanger that, in conjunction with the HURRICANE FURNACE, will provide 106 degree hot water for as long as is desired. The system typically requires a heat source with a minimum of 36K BTU. The CONSTAHOT™ has a sensing switch that, when the water temperature in the 6 gallon buffer tank reaches a certain level, signals the Hurricane furnace to come on, circulating hot fluid through the CONSTAHOT™ heat exchanger and pre-heating the domestic water. The CONSTAHOT™ uses a standard UL listed hot water heater made by Seaward Products which has a 1500 W 120 V electric element as well as a small heat exchange loop. The pre-heating heat exchanger is IAMPMO rated for domestic water. FIGS. 5 and 6 disclose the MAGICHOT™ embodiment of the invention, which is is an add-on accessory for installations where the replacement of the entire water heater is not desirable. It consists of the same pre-heating heat exchanger that is used with the previous embodiment and is contained that is used with the previous embodiment and is contained in a small, easily mounted box with clearly labeled hose connections. An accessory kit consisting of a sensing trigger and pipe fittings is available to allow conversion of most existing hot water heaters. Both the CONSTAHOT™ and the MAGICHOT™ are compact, easily installed units that add an unlimited hot water feature to systems where, because of space, fuel or safety considerations, such a feature was unavailable.

The following Table provides technical information that may be helpful in constructing the invention.

TABLE

|  | ConstaHot | MagicHot |
|---|---|---|
| Size: | 14"W-15"H-21"D | 9"W-5"H-4.5"D |
| Fittings: | On left side, 2 ⅝ hose barbs 2 ½ pipe male pipe fittings. El. | On front, 2 ⅝ hose barbs 2 ½ male pipe fittings. No el. |
| Storage: | 6 gallons in aluminum tank | N/A |
| BTU Req.: | Minimum 36K | Minimum 36K |
| Construction: | Case SS, Plumbing Copper/Brass | Case AL, Plumbing Copper/Brass |
| Temp. Valve: | Watts 70-A 120–160 degrees Adj | Watts 70-A 120–160 degrees Adj. |

Another embodiment of the invention, known under the trademark COMFORTHOT™, is a supplemental space heating system that includes a supplemental heating unit coupled to an existing hot water heating system in a recreational vehicle, and is powered by electrical power from a conventional AC power outlet. Preferably, the existing hot water heating system used with this embodiment is the first embodiment of the present invention as described above and shown in FIGS. 1 and 2. The supplemental heating unit includes a tank enclosed by an outer covering. Cold water is input at the bottom of the tank, heated by a pair of 2000-Watt heating elements, and allowed to exit the invention. A plurality of thermostats control the actuation of the unit.

This embodiment of the invention is designed to be installed in a closed circuit relationship with the currently existing furnace and holding tank of a recreational vehicle. Water from the tank is driven by a pump through a furnace, through a series of heat exchangers and back into the invention. This embodiment may be wired via a three-way switch to an external source of 120 Volt AC power, in parallel with an air conditioner mounted on the recreational vehicle. This embodiment is advantageous because an external source of power can be used to heat water instead of using a conventional diesel fired furnace. This is important because a recreational vehicle can take advantage of an electrical power hookup at an RV park, where the cost of operating the invention is absorbed into the overall nightly rental fee that is charged by the RV park. Another advantage of this embodiment is that it is a self-contained unit, and is compact and easy to install. Yet another advantage is that the invention uses the existing electrical circuitry that is designed for use for the air conditioner in a recreational vehicle. Still another advantage is that the tank of the present invention provides additional fluid capacity in the water heating system of a recreational vehicle. Still another advantage is that the invention can be used as a sole heating source for a recreational vehicle as well as a supplement to an existing diesel powered furnace.

One advantage of all embodiments of the invention is that they can be used with a pre-existing, independent heat source. This is important when the invention is installed in an environment where weight and space is at a premium, such as in a boat, camper, trailer or other recreational vehicle. Another advantage of the invention is that the pre-heating operation that takes place in the heat exchanger rapidly heats a small amount of water that is immediately available for use. Additionally, the flash heating process introduces no additional moving parts to the overall heating system, and is safer than open flame/gas/electric heaters because those heaters present a potential fire hazard.

The invention may be thought of as the devices or systems shown above. It may also be thought of as a method of using a water-containing fluid as a flash heating source. It may also be thought of as a water-to-water method of heating potable water. Distinguishing features of the invention include: (1) flash heating a water-containing fluid to heat potable water; (2) using a glycol/water mixture as a heating fluid, as previously described; (3) providing water-to-water heating of potable water; (4) providing a heating system with a continuous hot-water output; (5) providing a heating system with no moving parts; (6) providing a non-demand system; and (7) providing a water heating system that slaves off of an existing water heater.

While the present invention has been shown and described with reference to the foregoing operational principles and preferred embodiment, it will be apparent to those skilled in the art that other changes in form and detail may be made therein without departing from the spirit and scope of the invention as defined in the appended claims.

I claim:

1. A supplemental heating system for heating a first liquid, the supplemental heating system being configured for use in a recreational vehicle, the recreational vehicle having a primary heating system that also heats the first liquid, the supplemental heating system comprising:
   a heating element that heats a second liquid; and
   a heat exchanging component removably fitted into the recreational vehicle and having a first liquid conduit for permitting the first liquid to enter and exit the heat exchanging component, and a second liquid conduit for permitting the second liquid to enter and exit the heat exchanging component;
   wherein heat from the second liquid is transferred to the first liquid within the heat exchanging component to provide a heating operation of the first liquid independent of the primary heating system of the recreational vehicle.

2. The supplemental heating system of claim 1, wherein the supplemental heating system heats the first liquid prior to the primary heating system heating the first liquid.

3. A supplemental potable water heater for a recreational vehicle, the vehicle having a primary potable water heating system installed therein that heats potable water, the supplemental potable water heater comprising:
   a supplemental heating element independent of the primary potable water heating system; and
   a heat exchanging component that transfers heat generated by the supplemental heating element to the potable water prior to the potable water being heated by the primary potable water heating system, thereby tending to provide a substantially constant flow of potable water at a predetermined temperature.

4. The supplemental potable water heater of claim 3, further including:
   a heating fluid that transfers heat from the supplemental heating element to the potable water;
   a first conduit that directs the potable water into and out of the heat exchanging component; and
   a second conduit that directs the heating fluid into and out of the heat exchanging component.

5. The supplemental potable water heater of claim 4, further comprising a tempering valve configured to mix selectively the potable water flowing into the first conduit with the potable water flowing from the first conduit, thereby to vary the temperature of the potable water flowing from the first conduit.

6. The supplemental water heater of claim 3, wherein the supplemental potable water heater is retrofittable into the recreational vehicle.

7. A heating system for a recreational vehicle, comprising:
   a primary water heater located in the recreational vehicle;
   a primary water storage vessel associated with the primary water heater;
   a pre-heater in communication with and installed upstream of the primary water heater, the pre-heater including a supplemental heat source independent of the primary water heater; and
   a secondary water storage vessel associated with the pre-heater, the secondary water storage vessel having a substantially smaller water volume storage capacity than that of the primary water storage vessel;
   wherein the pre-heater heats water prior to the water being heated by the primary heater, thereby tending to provide a substantially constant flow of water at a preselected temperature.

8. The heating system of claim 7, further including:
   a heating fluid that transfers heat from the pre-heater to the water;
   a first conduit that directs the water into and out of the pre-heater; and
   a second conduit that directs the heating fluid into and out of the pre-heater.

9. The heating system of claim 8, further comprising a tempering valve that is configured to mix selectively the water flowing into the first conduit with the water flowing out of the first conduit to vary the temperature of the water flowing out of the first conduit.

10. The heating system of claim 7, wherein the pre-heater is powered independent of the primary heating system and the recreational vehicle.

11. A supplemental heating system for heating a first fluid, the supplemental heating system being configured for use in a recreational vehicle, the recreational vehicle having a primary heating system that also heats the first fluid, the supplemental heating system comprising:

a supplemental heating element independent from the primary heating system that heats a second fluid; and a heat exchanging component removably fitted into the recreational vehicle and having a first fluid conduit for permitting the first fluid to enter and exit the heat exchanging component, and a second fluid conduit for permitting the second fluid to enter and exit the heat exchanging component;

wherein heat from the second fluid is transferred to the first fluid within the heat exchanging component to provide a heating operation of the first fluid independent of the primary heating system of the recreational vehicle.

12. The supplemental heating system of claim 1, wherein the supplemental heating system heats the first fluid prior to the primary heating system heating the first fluid.

* * * * *